Oct. 30, 1951  L. D. STATHAM ET AL  2,573,286
STRAIN GAUGE MEASUREMENT INSTRUMENT
Filed April 10, 1945
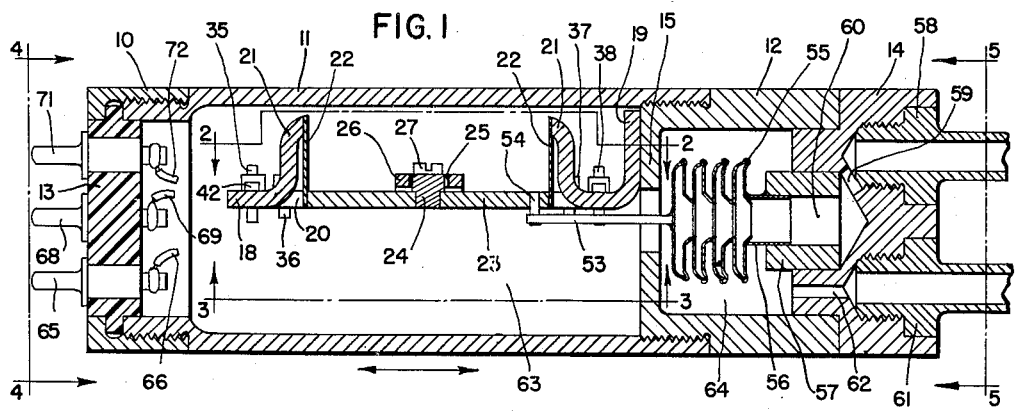
INVENTOR.
LOUIS D. STATHAM
CARLOS J. BAKER
BY George F. Goodyear
ATTORNEY Patented Oct. 30, 1951

2,573,286

UNITED STATES PATENT OFFICE 2,573,286

STRAIN GAUGE MEASUREMENT INSTRUMENT

Louis D. Statham, Beverly Hills, and Carlos J. Baker, Los Angeles, Calif., assignors to Curtiss-Wright Corporation, a corporation of Delaware Application April 10, 1945, Serial No. 587,631

25 Claims. (Cl. 73—398)

This invention relates to instruments for measuring forces, movements, fluid pressures and the like, including those varying at relatively high frequencies.

In accordance with the present invention, novel forms of measuring instruments have been developed which have a number of important advantages and uses. These instruments are compact, simple and light in construction, and can be easily and quickly calibrated. They can be arranged to measure forces, including accelerations, movements and fluid pressures of numerous types, whether original or derived, and can be constructed for any desired range. By employing one, or two or three such instruments oriented at angles to each other, they can be used to measure forces or motions in a single line, or in one plane or in three-dimensional space. In the case of pressure responsive instruments, they can be made of high sensitivity over a relatively narrow range of pressures, or of lower sensitivity over a wide pressure range. They can be made to indicate either liquid or gaseous pressures in either high or low pressure ranges.

In the drawings: Figure 1 is an enlarged longitudinal cross section of one form of pressure gage according to the present invention; Figures 2, 3, 4 and 5 are views taken along the lines 2—2, 3—3, 4—4 and 5—5, respectively, of Figure 1; Figure 6 is a partly schematic and distorted view of an arrangement for winding the strain wire; Figure 7 is a schematic wiring diagram of a circuit in which the instrument according to the present invention may be incorporated; and Fig. 8 is a longitudinal section through another form of force and motion measuring instrument. For clearness in illustration, the wiring has been omitted from Figs. 1–8 of the drawings.

In accordance with this invention, force or motion or fluid pressure is measured as a function of the change in electrical resistance of one or more wires, known as strain wires, which constitute the sensitive element or elements of the instrument. These wires are caused to change in length as a result of force, motion or fluid pressure indirectly applied to the wires, in a fashion as hereinafter described.

Referring now to the drawings, illustrating one embodiment of the invention for measuring pressures, the principal working parts of the instrument are enclosed in a cylindrical housing including cylindrical members 10, 11 and 12 and end pieces 13 and 14. The three members 10, 11, and 12 are threadably interengaged, as shown. The end piece 13 is of insulating material, and is held in place by members 10 and 11, as shown. End piece 14 is press fitted into member 12, as shown. Member 12 is provided with an inturned annular flange 15, as shown. Firmly attached to the flange 15, such as by means of welding, bolts or the like, is a frame member 18, provided with a flange 19 for attachment to the flange 15 and a central rectangular aperture 20. From the inner ends of aperture 20 extend a pair of integral ears 21, which are preferably formed by bending the metal forming part of the frame 18. Each of these ears is bent over at its outer end to form a flat surface for attachment, adjacent one edge portion, to one of a pair of rectangular flat springs 22. Each spring 22 is attached adjacent its opposite edge to one end of a suspended table member 23. This table 23 fills the major part of the space formed by the opening 20. It will be seen that by this construction the table 23 is permitted motion, by means of flexure of the springs 22, in the directions indicated by the double-ended arrows in Figures 1, 2 and 3, but is substantially prevented from motion in other directions, e. g. at right angles thereto. The degree or amount of motion in the permitted direction is restricted by means of a pin 24 rigidly mounted in table 23. This pin rides in a hole or recess 25 formed in a yoke 26 attached to frame 18 by means of bolts 27. In Figure 2, the clearance between the pin 24 and the right and left edges of the hole 25 is the amount of permitted motion, this being exaggerated for the sake of clearness in illustration.

Mounted in frame 18 are eight electrical terminals 31, 32, 33, 34, 35, 36, 37 and 38, insulated from the frame 18 by means of bushings 39. Also mounted in frame 18 are four pins 41, 42, 43 and 44, these pins being made out of insulating material or being provided with an insulating surface, such as anodized aluminum. Mounted in table 23 are four insulating pins 45, 46, 47 and 48 similar in construction to pins 41, 42, 43 and 44.

The pins and terminals described in the preceding paragraph are used for the mounting of four strain wires 49, 50, 51 and 52 in a fashion now to be described. The wire 49 is soldered or otherwise attached adjacent one end thereof, to the terminal 31. It is then wound successively, as shown, around the pins 41, 47 and 41 again, under a predetermined tension, and then soldered or otherwise attached adjacent the opposite end thereof, to the terminal 32. The two windings around the pin 41 are carefully kept separate from each other to avoid electrical contact therebetween. Wire 50 is similarly soldered to terminals 34 and 33 and wound around pins 43, 45 and 43 again. Wire 51 is similarly soldered to terminals 38 and 37 and wound around pins 44, 46 and 44 again. Finally, wire 52 is similarly soldered to terminals 35 and 36 and wound around pins 42, 43 and 42 again.

The strain wires 49, 50, 51 and 52 constitute the sensitive elements of the instrument. These wires should be extremely uniform in size and electrical resistivity and should be linear in their response to change of resistivity due to change in length. The wires should also be linear in their change of length with change of applied force, that is, they should obey Hooke's law as closely as possible throughout their range of movement. By selecting wires of these characteristics, the instrument will not require extensive calibration. In addition, the wires preferably should have a relatively low temperature coefficient of resistivity. "Constantan" and "Advance" wire satisfy these requirements to a very satisfactory extent. Finally, the tension under which the wires are wound should be carefully controlled, and should preferably be uniform for all four wires. The tension should preferably be one-half the elastic limit of the wires, so that motion of the table 23 may take place in either direction.

From the above description, it will be evident that any movement of the table 23 in the direction indicated by the arrows is accompanied by the expansion or contraction of wires 49, 50, 51 and 52. Movement to the right causes wires 49 and 52 to expand and wires 50 and 51 to contract. Movement to the left causes wires 50 and 51 to expand and wires 49 and 52 to contract. Either movement occurs as a result of stress applied to the table 23, which is borne mainly by the wires 49, 50, 51 and 52 and to a very small extent by the springs 22. Since the linearity of response and the constancy of calibration of the wires is much more satisfactory than that of the springs, it is desired to have the springs as "soft" as possible and still give the required support, so that they may bear as little of the load as possible, such as less than 10 per cent and preferably less than 5 per cent. The connection between the frame 18 and the table 23 may be by means other than flat springs, such as rollers. Springs are preferred, however, for a number of resons: (a) their relative simplicity, (b) the deformation of springs varies directly with the applied force, so that the response approaches linearity, while the friction due to rollers is apt to decrease rather than increase with motion, (c) the use of rollers may introduce a time lag in response, due to inertia, thus decreasing the sensitivity of the instrument, while springs are relatively free from this defect as long as the natural period of vibration of the springs is shorter than the frequency of the pressure being measured.

Movement of the table 23 in response to pressure is effected through the medium of a rod 53 attached at one end to the table by means of a post 54, such as by soldering or the like. This rod extends through the central opening in the flange 15, and is attached at its opposite end to a flexible fluid-tight bellows 55. As in the case of the leaf springs 22 supporting the table 23, this bellows is designed to bear as little of the load as possible, such as less than 10 per cent and preferably less than 5 per cent, and still accomplish its required function, as hereinafter described.

The wires 49, 50, 51 and 52, on the other hand, bear the major portion of the load, such as in excess of 90 per cent and preferably more than 95 per cent. It is important, however, that the wires should not be strained beyond their elastic limit. This is effectually prevented by means of the stop pin 24.

The opposite end of the bellows 55 is attached to a sleeve 56 which is attached in turn to a bushing 57 press fitted into an opening in housing member 14. A nipple 58 is threadably engaged with housing 14, and is in communication with the interior of bellows 55 by means of a passageway 59. There is thus formed a chamber 60 defined by the bellows 55, sleeve 56, bushing 57, passageway 59 and nipple 58, this chamber being made as fluid-tight as possible, except of course through the exterior opening of nipple 58. A second nipple 61 is threaded into housing member 14 and communicates with the space within the instrument and outside of the bellows 55 by means of a passageway 62. Bellows 55 is spaced sufficiently far from the flange 15 so that there is free communication within all parts of the instrument, including the two chambers indicated at 63 and 64, respectively, separated by flange 15, except for chamber 60. Chambers 63 and 64 are also preferably made as fluid-tight as possible, except for the exterior opening through nipple 61.

The bellows 55 is preferably constructed out of soft metal, such as copper, and with relatively thin walls and as large a number of folds as possible. With this construction, any change of pressure within the chamber will cause the bellows to expand or contract in an axial direction, resulting in a corresponding movement of rod 53 and table 23. As stated hereinbefore, the bellows should be as flexible as possible and still withstand the pressure to which it is subjected. This, of course, will depend upon the sensitivity and range of the particular instrument involved. For high ranges, thicker walls are necessary, while for high sensitivity extremely thin walls are desirable.

In use, one of the nipples 58 or 61 (preferably the nipple 58) is connected to the source of pressure being measured, while the remaining nipple is connected to atmospheric or some other base or standard pressure.

The four wires 49, 50, 51 and 52 are incorporated as the four arms of a Wheatstone bridge, as will be described later in connection with Figure 7. The wiring to accomplish this is shown for the most part in Figure 2. Terminal 31 is connected to an external terminal 65 by means of a conducting wire 66, and to terminal 38 by means of a conducting wire 67. This serves to connect one end of each of bridge arms 49 and 51 to external terminal 65. Terminal 36 is connected to an external terminal 68 by means of a conducting wire 69, and to terminal 37 by means of a conducting wire 70. This serves to connect one end of bridge arm 52 and the opposite end of bridge arm 51 to external terminal 68. Terminal 35 is connected to an external terminal 71 by means of a conducting wire 72, and to terminal 34 by means of a conducting wire 73. This serves to connect one end of bridge arm 50 and the opposite end of bridge arm 52 to external terminal 71. Finally, terminal 32 is connected to an external terminal 74 by means of a conducting wire 75, and to terminal 33 by means of a conducting wire 76, terminal 77, fixed resistor 78, terminal 79 and conducting wire 80. This serves to connect the opposite ends of bridge arms 49 and 50 to the external terminal 74, bridge arm 50 being connected through resistor 78. Since it is not practicable to make a balanced bridge with equal arms, the resistor 78 is incorporated in the bridge to bring it into balance.

With the four arms of the bridge described above approximately equal in resistance, the variation in output voltage of the bridge is directly proportional to the change in resistance of the strain wire, in accordance with well known principles of Wheatstone bridge construction. The pressure acting to produce the change can then be read on a suitable galvanometer, whose scale divisions can be caused to read directly in pressure units. If desired, the Wheatstone bridge, galvanometer and current source can all be incorporated in the same housing with the instrument proper. For many applications, however, a distinct advantage of the present invention is that the instrument proper (normally of small size) may be located at a considerable distance from any recording or indicating equipment, without loss of accuracy and sensitivity and without any time lag in responding to changes in force or motion.

Each of the wires 49, 50, 51 and 52 may be wound with a single turn around the pins 47, 45, 46 and 48, respectively, or with a plurality of turns, as shown in Figure 6. With a single turn and wire of relatively small diameter, the greatest sensitivity is attained. With more than one turn, and with wire of larger diameter, or both, the sensitivity is decreased but the range is considerably extended. It is obvious that the number of turns and the size of wire used will depend upon the use to which the instrument is to be put. When more than one turn is used, it is important that the successive turns be separated from each other, as shown in Figure 6, to avoid electrical contact.

In Figure 7 there is shown a generally schematic view of a suitable wiring arrangement of the instrument illustrated in the remaining figures. The four strain wires, 49, 50, 51 and 52 constitute the four arms of a Wheatstone bridge, as shown. The two terminals 68 and 74 are connected in conventional fashion to a power source such as a battery 83, while the remaining two terminals 65 and 71 are connected to a recording or indicating instrument such as galvanometer 81. It will be noted that, by this arrangement, the two wires 49 and 52, which expand together and contract together, are opposite arms of the bridge. The same is true of wires 50 and 51.

The power source may include an oscillator or other similar source of alternating current, while the output circuit feeding the galvanometer or other indicating or recording equipment, such as an oscillograph, may include amplifiers, rectifiers and the like. The bridge circuit may be normally balanced or normally unbalanced, such as by means of biasing resistor 82, shown in dotted lines. An unbalanced bridge is preferred when an alternating current is used as the power source, so that the direction of force or motion fluctuations can be readily determined.

From the above description, it will be seen that there has been provided an extremely accurate and compact instrument for the measurement and/or recording of pressure. The instrument is particularly applicable to making accurate time studies and faithfully recording pressures varying at high frequencies. Many other uses will also be apparent from the above description.

In the embodiment of the invention shown in Fig. 8, for measuring force or motion, the working parts are enclosed in a housing including a base plate 100, a pair of flanged end plates 101 and 102, these parts being secured together by any suitable means. The parts and electrical connections within the housing are substantially like those herein before described in connection with Figs. 1 through 6, and similar parts are designated by corresponding reference numerals. The same is true of the external circuit arrangement for the force or motion measuring instrument which may be as shown in Fig. 7. As shown in Fig. 11, the frame 18 is rigidly connected by fasteners 107 to end plate 102; and the table 23 which is supported from the frame 18 by leaf springs 22, is connected to the rod 53 whose outer end may be threaded as indicated at 108, for attachment to any suitable means for applying to the instrument the force or movement that is to be measured. These measurements may be by the galvanometer 81 shown in Fig. 7 or by its equivalent, as has heretofore been described in connection with Figs. 1 to 7, inclusive. The apparatus shown in Fig. 8 is particularly applicable to making accurate time studies and faithfully recording motions or forces varying at high frequencies, but as will be apparent there are many other uses.

The above description has been with reference to specific forms of the invention. It is to be understood, however, that the invention is not to be limited except as defined in the appended claims.

We claim:

1. In a fluid pressure gage, a fixed frame element, an element movable with respect to said frame element, a pair of leaf springs connecting said fixed and movable elements and restricting the movement of said movable element to a substantially straight line, first and second insulated pins mounted in said frame element adjacent one end of said movable element, third and fourth insulated pins mounted in said frame element adjacent the opposite end of said movable element, four insulated pins mounted in said movable element, the distances between said last named pins and said first, second, third and fourth pins varying with movements of said movable element, four pairs of electrical terminals mounted on one of said elements, and four electrical wire resistors, each of said wire resistors being attached adjacent its ends to a pair of said terminals and wound around one of said first, second, third and fourth pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct and linear proportion to the applied force by reason of relative movement between said pins and being made out of a material whose resistance varies substantially linearly with changes in length, a substantially fluid-tight chamber adapted to communicate with a source of pressure to be measured, a bellows expandable and contractable in response to fluid pressure changes comprising a wall of said chamber, and motion transmitting means connecting said movable element to a movable portion of said bellows, said wire resistors being arranged to carry a major portion of the load due to the pressure being measured.

2. In a fluid pressure gage, a fixed frame element, an element movable with respect to said frame element, a pair of leaf springs connecting said fixed and movable elements and restricting the movement of said movable element to a substantially straight line, first and second insulated pins mounted in said frame element adjacent one end of said movable element, third and fourth insulated pins mounted in said frame element adjacent the opposite end of said movable element, four insulated pins mounted in said movable element, the distances between said last named pins and said first, second, third and fourth pins varying with movements of said movable element, four pairs of electrical terminals mounted on one of said elements, and four electrical wire resistors, each of said wire resistors being attached adjacent its ends to a pair of said terminals and wound around one of said first, second, third and fourth pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct and linear proportion to the applied force by reason of relative movement between said pins and being made out of a material whose resistance varies substantially linearly with changes in length, a substantially fluid-tight chamber adapted to commmunicate with a source of pressure to be measured, a bellows expandable and contractable in response to fluid pressure changes comprising a wall of said chamber, and motion transmitting means connecting said movable element to a movable portion of said bellows, said wire resistors being arranged to carry at least 90 per cent of the load due to the pressure being measured.

3. In a fluid pressure gage, a substantially rigid container having a passage for connection with a source of fluid pressure, a bellows having its interior communicating with said passage, said bellows being disposed within and connected at one end with said container, a movable member within said container connected to the opposite end of said bellows for movement therewith, means supporting the member for movement relative to the container constrained to a path substantially parallel to the axis of expansion and contraction of the bellows, said supporting means comprising a pair of leaf springs disposed in planes substantially normal to said axis, a plurality of wire supporting elements extending from said member and a plurality of wire supporting elements extending from parts of said container, all of said elements extending in the same direction, and a plurality of strain wires each wound in tension between one such element on the member and one such element on one of said parts with the ends of the wires anchored to said parts, one pair of said wires being arranged to be further tensioned upon expansion of the bellows and another pair of said wires being arranged to be further tensioned upon contraction of said bellows, the span of each pair of wires between said supporting elements being in substantial symmetry relative to said axis, the wires of one pair comprising the opposite legs of a Wheatstone bridge circuit, and the wires of the other pair comprising the remaining legs of said circuit.

4. In a fluid pressure gage, a substantially rigid container having a passage for connection with a source of fluid pressure, a bellows having its interior communicating with said passage, said bellows being disposed within and connected at one end with said container, a movable member within said container connected to the opposite end of said bellows for movement therewith, means supporting the member for movement relative to the container constrained to a path substantially parallel to the axis of expansion and contraction of the bellows, said supporting means comprising a pair of leaf springs disposed in planes substantially normal to said axis, a plurality of wire supporting elements extending from said member and a plurality of wire supporting elements extending from parts of said container, all of said elements extending in the same direction, and a plurality of strain wires each extending in tension between one such element on the member and one such element on one of said parts with the ends of the wires anchored to said parts, one pair of said wires being arranged to be further tensioned upon expansion of the bellows and another pair of said wires being arranged to be further tensioned upon contraction of said bellows, and the span of each pair of wires between said supporting elements being in substantial symmetry relative to said axis.

5. In a fluid pressure gage, a substantially rigid container having a passage for connection with a source of fluid pressure, a bellows having its interior communicating with said passage, said bellows being disposed within and connected at one end with said container, a movable member within said container connected to the opposite end of said bellows for movement therewith, means supporting the member for movement relative to the container constrained to a path substantially parallel to the axis of expansion and contraction of the bellows, a plurality of wire supporting elements extending from said member and a plurality of wire supporting elements extending from parts of said container, all of said elements extending in the same direction, and a plurality of strain wires each extending in tension between one such element on the member and one such element on one of said parts with the ends of the wires anchored to said parts, one pair of said wires being arranged to be further tensioned upon expansion of the bellows and another pair of said wires being arranged to be further tensioned upon contraction of said bellows, the span of each pair of wires between said supporting elements being in substantial symmetry relative to said axis, the wires being electrically connected in arms of a Wheatstone bridge circuit with each wire of one pair arranged in an arm of the bridge circuit that is adjacent to each other arm that contains a wire of the other pair.

6. In a fluid pressure gage, a substantially rigid container having a passage for connection with a source of fluid pressure, a bellows having its interior communicating with said passage, said bellows being disposed within and connected at one end with said container, a movable member within said container connected to the opposite end of said bellows for movement therewith, means supporting the member for movement relative to the container constrained to a path substantially parallel to the axis of expansion and contraction of the bellows, a plurality of wire supporting elements extending from said member and a plurality of wire supporting elements extending from parts of said container, all of said elements extending in the same direction, and a plurality of strain wires each extending in tension between one such element on the member and one such element on one of said parts with the ends of the wires anchored to said parts, one pair of said wires being arranged to be further tensioned upon expansion of the bellows and another pair of said wires being arranged to be further tensioned upon contraction of said bellows, and the span of each pair of wires between said supporting elements being in substantial symmetry relative to said axis.

7. In a fluid pressure gage, a substantially rigid container having a passage for connection with a source of fluid pressure, a bellows having its interior communicating with said passage, said bellows being disposed within and connected at one end with said container, a movable member within said container connected to the opposite end of said bellows for movement therewith, means supporting the member for movement relative to the container constrained to a path substantially parallel to the axis of expansion and contraction of the bellows, a plurality of wire supporting elements extending from said member and a plurality of wire supporting elements extending from parts of said container, and a plurality of strain wires each extending in tension between one such element on the member and one such element on one of said parts with the ends of the wires anchored to said parts, one pair of said wires being arranged to be further tensioned upon expansion of the bellows and another pair of said wires being arranged to be further tensioned upon contraction of said bellows, the span of each pair of wires between said supporting elements being in substantial symmetry relative to said axis, and the wires being electrically connected in arms of a Wheatstone bridge circuit with each wire of one pair arranged in an arm of the bridge circuit that is adjacent to each other arm that contains a wire of the other pair.

8. In a fluid pressure gage, a substantially rigid container having a passage for connection with a source of fluid pressure, a bellows having its interior communicating with said passage, said bellows being disposed within and connected at one end with said container, a movable member within said container connected to the opposite end of said bellows for movement therewith, means supporting the member for movement relative to the container constrained to a path substantially parallel to the axis of expansion and contraction of the bellows, a plurality of wire supporting elements extending from said member and a plurality of wire supporting elements extending from parts of said container, and a plurality of strain wires each extending in tension between one such element on the member and one such element on one of said parts with the ends of the wires anchored to said parts, one pair of said wires being arranged to be further tensioned upon expansion of the bellows and another pair of said wires being arranged to be further tensioned upon contraction of said bellows, and the span of each pair of wires between said supporting elements being in substantial symmetry relative to said axis.

9. In a measuring instrument, a stationary member, a movable member, means supporting the movable member relative to the stationary member constrained to a path substantially parallel to the line of application to the movable member of the force or motion to be measured, said supporting means comprising a pair of substantially parallel leaf springs disposed in planes substantially normal to said line, a plurality of wire supporting elements extending from said movable member and a plurality of wire supporting elements extending from said stationary member, all of said elements extending in the same direction, and a plurality of strain wires each extending in tension between one such element on the movable member and one such element on the stationary member, and with the ends of the wires anchored to said stationary member, one pair of said wires being arranged to be further tensioned upon movement of the movable member in one direction and another pair of said wires being arranged to be further tensioned upon movement of the movable member in the opposite direction, the spans of each pair of wires between said supporting elements being in substantial symmetry relative to said line of application of force or motion, and the wires being electrically connected in arms of a Wheatstone bridge circuit with each wire of one pair arranged in an arm of the bridge circuit that is adjacent to each other arm that contains a wire of the other pair.

10. In a measuring instrument, a stationary member, a movable member, means supporting the movable member relative to the stationary member constrained to a path substantially parallel to the line of application to the movable member of the force or motion to be measured, said supporting means comprising a pair of substantially parallel leaf springs disposed in planes substantially normal to said line, a plurality of wire supporting elements extending from said movable member and a plurality of wire supporting elements extending from said stationary member, all of said elements extending in the same direction, and a plurality of strain wires each extending in tension between one such element on the movable member and one such element on the stationary member, and with the ends of the wires anchored to said stationary member, one pair of said wires being arranged to be further tensioned upon movement of the movable member in one direction and another pair of said wires being arranged to be further tensioned upon movement of the movable member in the opposite direction, and the spans of each pair of wires between said supporting elements being in substantial symmetry relative to said line.

11. In a measuring instrument, a stationary member, a movable member means supporting the movable member relative to the stationary member constrained to a path substantially parallel to the line of application to the movable member of the force or motion to be measured, a plurality of wire supporting elements extending from said movable member and a plurality of wire supporting elements extending from said stationary member, all of said elements extending in the same direction, and a plurality of strain wires each extending in tension between one such element on the movable member and one such element on the stationary member, and with the ends of the wires anchored to said stationary member, one pair of said wires being arranged to be further tensioned upon movement of the movable member in one direction and another pair of said wires being arranged to be further tensioned upon movement of the movable member in the opposite direction, the spans of each pair of wires between said supporting elements being in substantial symmetry relative to said line, and the wires being electrically connected in arms of a Wheatstone bridge circuit with each wire of one pair arranged in an arm of the bridge circuit that is adjacent to each other arm that contains a wire of the other pair.

12. In a measuring instrument, a stationary member, a movable member, means supporting the movable member relative to the stationary member constrained to a path substantially parallel to the line of application to the movable member of the force or motion to be measured, a plurality of wire supporting elements extending from said movable member and a plurality of wire supporting elements extending from said stationary member, all of said elements extending in the same direction, and a plurality of strain wires each extending in tension between one such element on the movable member and one such element on the stationary member, and with the ends of the wires anchored to said stationary member, one pair of said wires being arranged to be further tensioned upon movement of the movable member in one direction and another pair of said wires being arranged to be further tensioned upon movement of the movable member in the opposite direction, and the spans of each pair of wires between said supporting elements being in substantial symmetry relative to said line.

13. In a measuring instrument, a stationary member, a movable member, means supporting the movable member relative to the stationary member constrained to a path substantially parallel to the line of application to the movable member of the force or motion to be measured, a plurality of wire supporting elements extending from said movable member and a plurality of wire supporting elements extending from said stationary member, and a plurality of strain wires each extending in tension between one such element on the movable member and one such element on the stationary member, and with the ends of the wires anchored to said stationary member, one pair of said wires being arranged to be further tensioned upon movement of the movable member in one direction and another pair of said wires being arranged to be further tensioned upon movement of the movable member in the opposite direction, and spans of each pair of wires between said supporting elements being in substantial symmetry relative to said line, and the wires being electrically connected in arms of a Wheatstone bridge circuit with each wire of one pair arranged in an arm of the bridge circuit that is adjacent to each other arm that contains a wire of the other pair.

14. In a measuring instrument, a stationary member, a movable member, means supporting the movable member relative to the stationary member constrained to a path substantially parallel to the line of application to the movable member of the force or motion to be measured, a plurality of wire supporting elements extending from said movable member and a plurality of wire supporting elements extending from said stationary member, and a plurality of strain wires each extending in tension between one such element on the movable member and one such element on the stationary member, and with the ends of the wires anchored to said stationary member, one pair of said wires being arranged to be further tensioned upon movement of the movable member in one direction and another pair of said wires being arranged to be further tensioned upon movement of the movable member in the opposite direction, and the spans of each pair of wires between said supporting elements being in substantial symmetry relative to said line.

15. In a measuring instrument, a substantially rectangular first member having a central opening and opposed end portions, a second member extending in said opening to provide a face substantially coplanar with the adjacent faces of said opposed end portions, a pair of leaf springs connecting the end portions of said first member to the adjacent ends of the second member, said leaf springs being substantially parallel to each other and substantially normal to the plane of said coplanar faces to provide for relative and limited endwise movement of said members, and electrical resistance strain wires extending in tension along said faces in spaced relation thereto, said wires being supported by elements projecting from said faces, said wires being so arranged that at least one thereof is further tensioned by such relative movement in one direction and that at least one other thereof is further tensioned by such relative movement in the opposite direction.

16. In a measuring instrument a first member having spaced end portions, a second member extending in the space between said end portions to provide a face substantially coplanar with the adjacent faces of said opposed end portions, a pair of leaf springs connecting the end portions of said frame member to the adjacent ends of the second member, said leaf springs being substantially parallel to each other and substantially normal to the plane of said coplanar faces to provide for relative and limited endwise movement of said members, and electrical resistance strain wires extending in tension along said faces in spaced relation thereto, said wires being supported by elements projecting from said faces, said wires being so arranged that at least one thereof is further tensioned upon such movement in one endwise direction and that at least one other thereof is further tensioned upon such movement in the opposite direction.

17. In a measuring instrument, a fixed frame element, an element movable with respect to said frame element in a substantially straight line and in response to an applied force, first and second insulated pins mounted in said frame element adjacent one end of said movable element, third and fourth insulated pins mounted in said frame element adjacent the opposite end of said movable element, at least one insulated pin mounted in said movable element, all of said pins extending in substantially the same direction from said elements, the distances between said last named pin and said first, second, third and fourth pins varying with movements of said movable element, and four tensioned electrical wire resistors, each of said wire resistors being wound around one of said first, second, third and fourth pins and a said pin mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct proportion to the applied force by reason of relative movement between said pins.

18. In a measuring instrument, a fixed frame element, an element movable with respect to said frame element in a substantially straight line and in response to an applied force, first and second insulated pins mounted in said frame element adjacent one end of said movable element, third and fourth insulated pins mounted in said frame element adjacent the opposite end of said movable element, four insulated pins mounted in said movable element, all of said pins extending in substantially the same direction from said elements, the distances between said last named pins and said first, second, third and fourth pins varying with movements of said movable element, and four tensioned electrical wire resistors, each of said wire resistors being wound around one of said first, second third and fourth pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct and linear proportion to the applied force by reason of relative movement between said pins.

19. In a measuring instrument, a fixed frame element, an element movable with respect to said frame element in a substantially straight line and in response to an applied force, first and second insulated pins mounted in said frame element adjacent one end of said movable element, third and fourth insulated pins mounted in said frame element adjacent the opposite end of said movable element, four insulated pins mounted in said movable element, all of said pins extending in substantially the same direction from said elements, the distance between said last named pins and said first, second, third and fourth pins varying with movements of said movable element, and four electrical wire resistors, each of said wire resistors being wound under a predetermined tension around one of said first, second, third and four pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct and linear proportion to the applied force by reason of relative movement between said pins and being made out of a material whose resistance varies substantially linearly with changes in length.

20. In a measuring instrument, a fixed frame element, an element movable with respect to said frame element, a pair of leaf springs connecting said fixed and movable elements and restricting the movement of said movable element to a substantially straight line in response to an applied force, first and second insulated pins mounted in said frame element adjacent one end of said movable element, third and fourth insulated pins mounted in said frame element adjacent the opposite end of said movable element, four insulated pins mounted in said movable element, all of said pins extending in substantially the same direction from said elements, the distances between said last named pins and said first, second, third and fourth pins varying with movements of said movable element, and four electrical wire resistors, each of said wire resistors being wound around one of said first, second, third and fourth pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct and linear proportion to the applied force by reason of relative movement between said pins and being made out of a material whose resistance varies substantially linearly with changes in length, said wire resistors being arranged to carry a major portion of the load due to such applied force.

21. In a measuring instrument, a fixed frame element, an element movable with respect to said frame element, a pair of leaf springs connecting said fixed and movable elements and restricting the movement of said movable element to a substantially straight line in response to an applied force, first and second insulated pins mounted in said frame element adjacent one end of said movable element, third and fourth insulated pins mounted in said frame element adjacent the opposite end of said movable element, four insulated pins mounted in said movable element, all of said pins extending in substantially the same direction from said elements, the distance between said last named pins and said first, second, third and fourth pins varying with movements of said movable element, and four electrical wire resistors, each of said wire resistors being wound under a predetermined tension around one of said first, second, third and fourth pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expendable and contractable within their elastic limits in direct and linear proportion to the applied force by reason of relative movement between said pins and being made out of a material whose resistance varies substantially linearly with changes in length.

22. In a measuring instrument, a fixed frame element, an element movable with respect to said frame element, a pair of leaf springs connecting said fixed and movable elements and restricting the movement of said movable element to a substantially straight line in response to an applied force, first and second insulated pins mounted in said frame element adjacent one end of said movable element, third and fourth insulated pins mounted in said frame element adjacent the opposite end of said movable element, four insulated pins mounted in said movable element, all of said pins extending in substantially the same direction from said elements, the distances between said last named pins and said first, second, third and fourth pins varying with movements of said movable element, four pairs of electrical terminals mounted on one of said elements, and four electrical wire resistors, each of said wire resistors being attached adjacent its ends to a pair of said terminals and wound around one of said first, second, third, and fourth pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct and linear proportion to the applied force by reason of relative movement between said pins and being made out of a material whose resistance varies substantially linearly with changes in length, said wire resistors being arranged to carry at least 90 per cent of the load due to such applied force.

23. In a measuring instrument, a fixed frame element, an element movable with respect to said frame element, a pair of leaf springs connecting said fixed and movable elements and restricting the movement of said movable element to a substantially straight line in response to an applied force, first and second insulated pins mounted in said frame element adjacent one end of said movable element, third and fourth insulated pins mounted in said frame element adjacent the opposite end of said movable element, four insulated pins mounted in said movable element, all of said pins extending in substantially the same direction from said elements, the distance between said last named pins and said first, second, third and fourth pins varying with movemeans of said movable element, and four electrical wire resistors, each of said wire resistors being wound under a predetermined tension around one of said first, second, third and fourth pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct and linear proportion to the applied force by reason of relative movement between said pins and being made out of a material whose resistance varies substantially linearly with changes in length, said wire resistors being arranged to carry at least 90 per cent of the load due to such applied force.

24. In a measuring instrument, a pair of elements connected for relative linear movement, one of said elements having parts spaced apart along the line of movement, and the other of said elements being disposed between said spaced parts providing substantially coplanar surface portions on said parts and said other element which surface portions are substantially parallel to the line of movement, first wire supporting means projecting from such surface portion of said other element, second and third wire supporting means each projecting from such surface portion of a different one of said spaced parts, all of said wire supporting means projecting substantially in the same direction, at least one strain wire tensioned between said first and second wire supporting means, and at least one other strain wire tensioned between said first and third wire supporting means.

25. In a measuring instrument, a pair of elements connected for relative linear movement, one of said elements having parts spaced apart along the line of movement, and the other of said elements being disposed between said spaced parts providing substantially coplanar surface portions on said parts and said other element which surface portions are substantially parallel to the line of movement, first wire supporting means projecting from such surface portion of said other element, second and third wire supporting means each projecting from such surface portion of a different one of said spaced parts, all of said wire supporting means projecting substantially in the same direction, at least one strain wire tensioned between said first and second wire supporting means, at least one other wire tensioned between said first and third wire supporting means, and cooperating abutments on said elements for limiting said relative linear movement of said elements in both directions to maintain said wires tensioned without exceeding their elastic limits.

LOUIS D. STATHAM.
CARLOS J. BAKER.

REFERENCES CITED

The following references are of record in the file of this patent:

UNITED STATES PATENTS

| Number | Name | Date |
|---|---|---|
| 2,036,458 | Carlson | Apr. 7, 1936 |
| 2,059,549 | Carlson | Nov. 3, 1936 |
| 2,148,013 | Carlson | Feb. 21, 1939 |
| 2,256,473 | De Giers | Sept. 23, 1941 |
| 2,316,975 | Ruge | Apr. 20, 1943 |
| 2,338,732 | Nosker | Jan. 11, 1944 |